US009906674B2

(12) United States Patent
Nishii

(10) Patent No.: US 9,906,674 B2
(45) Date of Patent: *Feb. 27, 2018

(54) AUTHENTICATION DEVICE FOR USER AUTHENTICATION AND IMAGE FORMING APPARATUS INCLUDING THE AUTHENTICATION DEVICE

(71) Applicant: Sharp Kabushiki Kaisha, Osaka-shi, Osaka (JP)

(72) Inventor: Yasuto Nishii, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/970,254

(22) Filed: Dec. 15, 2015

(65) Prior Publication Data
US 2016/0100074 A1 Apr. 7, 2016

Related U.S. Application Data

(63) Continuation of application No. 14/445,285, filed on Jul. 29, 2014, now Pat. No. 9,213,815.

(30) Foreign Application Priority Data

Aug. 27, 2013 (JP) ................. 2013-175421

(51) Int. Cl.
G06F 15/00 (2006.01)
H04N 1/00 (2006.01)
(Continued)

(52) U.S. Cl.
CPC ....... H04N 1/00925 (2013.01); G06F 3/1204 (2013.01); G06F 3/1222 (2013.01);
(Continued)

(58) Field of Classification Search
None
See application file for complete search history.

(56) References Cited

U.S. PATENT DOCUMENTS

2006/0288234 A1* 12/2006 Azar ............... G06F 21/32
713/186
2008/0170258 A1 7/2008 Yamamura
(Continued)

FOREIGN PATENT DOCUMENTS

CN 101226354 A 7/2008
CN 102326133 A 1/2012
(Continued)

OTHER PUBLICATIONS

Asao Shimazaki et al. "Sense You Technology Biz NI Yoru Security No Kyoka" (Security Enhancement by Sense You Technology Biz), Fujitsu, Fujitsu Ltd., May 10, 2013, vol. 64, No. 3, pp. 224-230.
(Continued)

Primary Examiner — Helen Q Zong
(74) Attorney, Agent, or Firm — Birch, Stewart, Kolasch & Birch, LLP

(57) ABSTRACT

A user authentication device provided on an apparatus as an object of operation acquires feature data representing notable portion of the user, using a camera device, after user authentication. Based on the acquired feature data, the user authentication device tracks the user by the camera (step S1030). If it is detected by the tracking that the user has left the apparatus, the user authentication device displays a log-in screen image on an operation panel (step S1060). If it is detected that the user once left the apparatus has returned to a position where he/she can operate the apparatus, the user authentication device displays the screen image that has been previously operated by the user. On the other hand, if it is detected that the tracking has been interrupted
(Continued)

after the user left the apparatus, the user authentication device executes a log-out process (step S1120).

9 Claims, 12 Drawing Sheets

(51) Int. Cl.
*G06F 21/31* (2013.01)
*H04N 1/44* (2006.01)
*G06F 21/32* (2013.01)
*G06F 3/12* (2006.01)

(52) U.S. Cl.
CPC ........... *G06F 3/1238* (2013.01); *G06F 21/31* (2013.01); *G06F 21/32* (2013.01); *H04N 1/00251* (2013.01); *H04N 1/00411* (2013.01); *H04N 1/00915* (2013.01); *H04N 1/442* (2013.01); *H04N 1/4433* (2013.01); *G06F 2221/2111* (2013.01); *H04N 2201/0094* (2013.01)

(56) References Cited

U.S. PATENT DOCUMENTS

| | | | | |
|---|---|---|---|---|
| 2011/0115877 | A1* | 5/2011 | Kang | H04N 7/147 348/14.12 |
| 2011/0296163 | A1* | 12/2011 | Abernethy | G06F 1/3203 713/100 |
| 2013/0100488 | A1 | 4/2013 | Maezawa et al. | |
| 2014/0211240 | A1* | 7/2014 | Maki | G06F 3/1222 358/1.14 |

FOREIGN PATENT DOCUMENTS

| | | |
|---|---|---|
| JP | H0937187 A | 2/1997 |
| JP | H0962629 A | 3/1997 |
| JP | H09245138 A | 9/1997 |
| JP | 2006-302199 A | 11/2006 |
| JP | 2008-146449 A | 6/2008 |
| JP | 2010176278 A | 8/2010 |
| JP | 2013025057 A | 2/2013 |

OTHER PUBLICATIONS

Takeuchi et al. "Display Kara No Shikaku Teki Jyouhou Rouei Boushi System No Kaihatsu" (Developement of a System for Preventing Visual Information Leakage from Disply), Report of Special Interest Groups,Japan, Information Processing Society of Japan, May 21, 2004, vol. 2004,No. 54 pp. 19-24.

Yamaguchi et al. Sys. 'Smartface' (Face Recognition System Robust Against Changes in Posture and Facial Expressions,'Smartface'), Transact. of the Inst. of Electr., Info and Comm. Engr, D-II, JP, the Inst. of Electronics, Information and Communication Engineers, Jun. 1, 2001, vol. J84-D-II, No. 6, pp. 1045-1052.

* cited by examiner

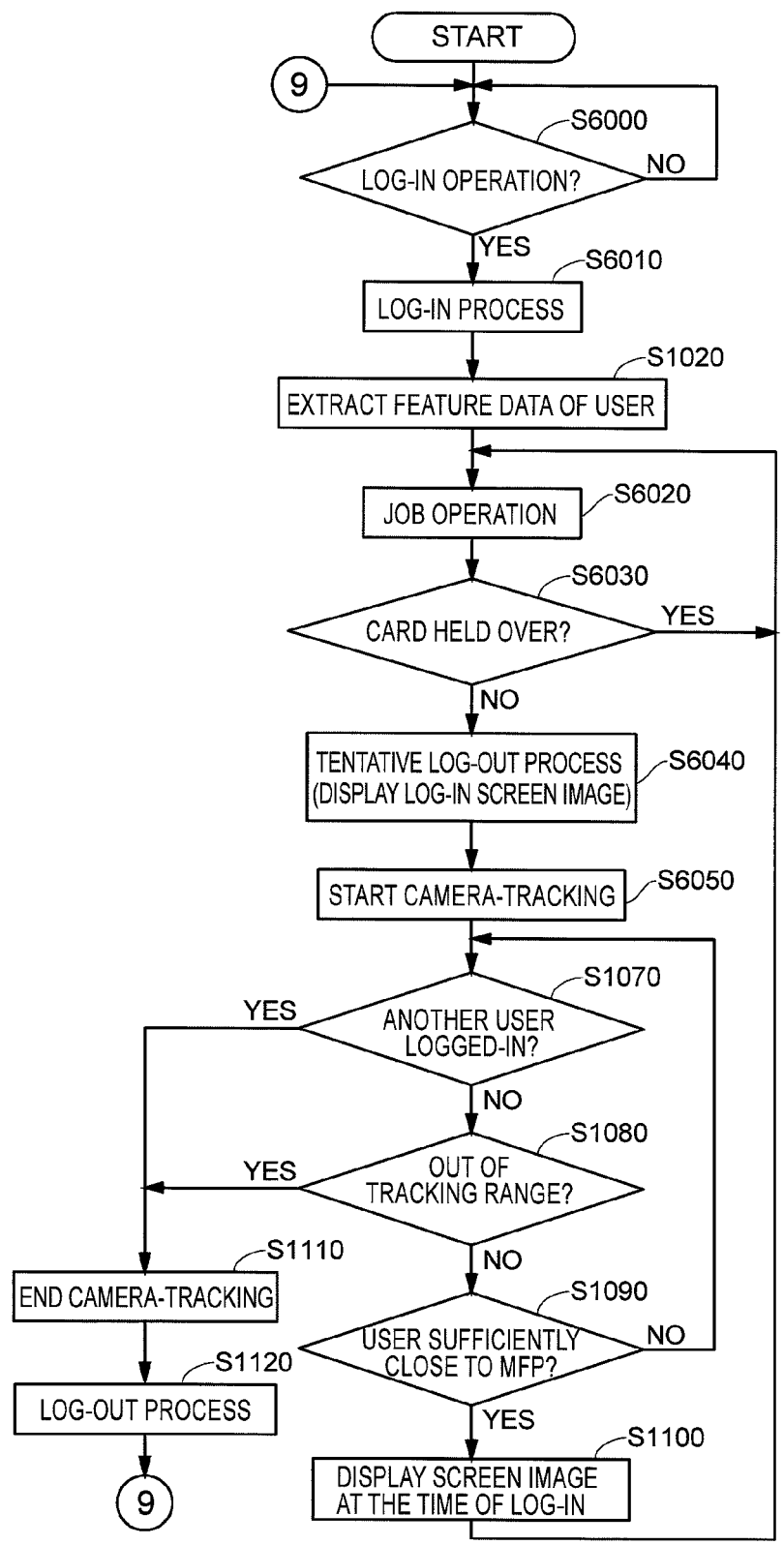

AUTHENTICATION DEVICE FOR USER AUTHENTICATION AND IMAGE FORMING APPARATUS INCLUDING THE AUTHENTICATION DEVICE

CROSS-REFERENCE TO RELATED APPLICATION

This application is a continuation of copending non-provisional application Ser. No. 14/445,285 filed Jul. 29, 2014, which claims priority under 35 U.S.C. § 119(a) to Japanese Patent Application No. 2013-175421 filed in Japan on Aug. 27, 2013, the entire contents of which are hereby incorporated by reference.

BACKGROUND OF THE INVENTION

Field of the Invention

The present invention relates to an authentication apparatus and an image forming apparatus including the authentication apparatus and, more specifically, to a technique for reducing the trouble of re-authentication.

Description of the Background Art

As one type of information processing apparatuses, an image forming apparatus (typically a copy machine) has been introduced to many places of business (companies and offices). Image forming apparatuses having a plurality of operational modes including a copy mode, an image communication mode (typically a facsimile mode), a network compatible printer mode and a scanner mode, such as an MFP (MultiFunction Peripheral), are increasing in number.

An image forming apparatus such as an MFP is typically shared by a plurality of users. When one image forming apparatus is shared by a plurality of users, it becomes difficult to grasp usage conditions. Further, such an image forming apparatus may be installed at a location where many people including outsiders come in and go out. In such a situation, it is difficult to maintain security.

In view of the forgoing, recently, it becomes more common to allow use of an apparatus after a log-in process (user authentication), in order to improve security level and to mange use conditions user by user. Log-in process allows use of the image forming apparatus by only the logged-in user and, therefore, the security level can be improved. Further, log-in process allows inspection of individual use history of the image forming apparatus and, hence, management of use condition user by user becomes easier.

On the other hand, if a logged-in user moves away from the image forming apparatus without a log-out operation, the logged-in state is maintained and, therefore, a different user can use the image forming apparatus utilizing the log-in state of the previous user (user name).

If the logged-in user always logs out when he/she moves away from the image forming apparatus, such a problem can be avoided. Users, however, often forget to log-out. Thus, a technique of automatically performing the log-out process (cancelling authentication) when the apparatus is not operated for a given time period in the logged-in state has been known.

Further, in connection with such a problem, Japanese Patent Laying-Open No. 2006-302199 (hereinafter referred to as '199 Reference) discloses a technique of monitoring a user who logged-in to an information processing apparatus through biometric authentication and locking the information processing apparatus when the user is detected to have moved away from the apparatus.

When the conventional art described above is used, once the log-out process takes place and the same user is to use the image forming apparatus, user authentication is required anew. Re-authentication is troublesome for the user. Particularly if the same user is to use the image forming apparatus soon and re-authentication of the user is required, it would be burdensome for the user. Such a problem cannot be solved by the technique disclosed in '199 Reference.

SUMMARY OF THE INVENTION

Therefore, it is desirable to provide an authentication apparatus capable of alleviating the trouble of re-authentication and an image forming apparatus including the authentication apparatus.

According to a first aspect, the present invention provides an authentication device provided on an apparatus as an object of operation for authorizing a user of the apparatus, including: a display device configured to display information; an authentication processing unit configured to execute an authentication process for the user; a first display control unit causing, responsive to the authentication processing unit having authenticated the user, the display device to display an operation screen image to be operated by the user; an image pick-up device configured to pick-up an image of the user authenticated by the authentication processing unit; a feature information acquiring unit configured to acquire feature information of the user by using the image pick-up device; a tracking unit configured to track the user based on the acquired feature information, by controlling the image pick-up device; a switching unit switching, responsive to the tracking unit detecting the user having moved away from the apparatus, display of the display device to a screen image different from the operation screen image; a second display control unit causing, responsive to the tracking unit detecting the user once having moved away from the apparatus and having returned to a position where the user can operate the apparatus without interruption of tracking, the display device to display the operation screen image; and a cancelling unit configured to execute, responsive to the tracking unit detecting interruption of tracking after the user moved away from the apparatus, a process of cancelling authentication for the user.

When user authentication is executed, an operation screen image operated by the user is displayed. The authentication device picks up an image of the user by using the image pick-up device and acquires feature information of the user. Based on the acquired feature information, the authentication device tracks the user, by controlling the image pick-up device. When it is detected by the user tracking that the user has moved away from the apparatus, the authentication device displays a screen image different from the operation screen image. If it is detected that the user, who once moved away from the apparatus, has returned to a position allowing operation of the apparatus while tracking is successfully continued, the authentication apparatus again displays the operation screen image. On the other hand, if it is detected that the tracking failed after the user moved away from the apparatus, the authentication device executes a process of cancelling the user authentication.

By picking-up an image of the authenticated user, the feature information of the user is acquired. Based on the acquired feature information, whether the user has moved away from the apparatus as the object of operation or not can be detected. If it is detected that the user has moved away from the apparatus, the authentication device displays a screen image different from the operation screen image. The different screen image is different from the screen image operated by the user authenticated by the authentication processing unit. Therefore, it is possible to prevent some other user from slipping in and using the apparatus utilizing the authority of the authenticated user. Further, if it is detected that the user, who once moved away from the apparatus, has returned to a position allowing operation of the apparatus while tracking is successfully continued, the operation screen image is again displayed. Thus, the user can operate the operation screen image without re-authentication. Thus, the trouble of re-authentication can be avoided. Since the re-authentication is unnecessary, it is more convenient for the user. If the user returns to the position where operation of the apparatus is possible while tracking of the user has been successfully continued without interruption, the operation screen image is displayed, whereas if the tracking is interrupted, the process for cancelling authentication is executed. Thus, use of the apparatus by an unauthenticated third party can be prevented while convenience for the user is maintained.

Preferably, the switching unit includes a display switching unit switching, responsive to the tracking unit detecting the user having moved away from the apparatus, display of the display device to a display of an authentication screen image for authentication; the authentication processing unit includes an authentication executing unit configured to execute an authentication process in accordance with an operation of the authentication screen image. The authentication device further includes an authentication cancelling unit configured to execute, responsive to the authentication executing unit executing an authentication process for another user, a process of cancelling authentication for the user tracked by the tracking unit.

More preferably, the authentication device further includes a detection unit configured to detect overlapping of the user and another user based on the acquired feature information, by controlling the image pick-up device; and a display switching unit switching, responsive to the detection unit detecting overlapping with another user, display of the display device to a screen image different from the operation screen image.

More preferably, the authentication device further includes: a detection unit configured to detect that the user is facing sideways with respect to the apparatus, based on the acquired feature information, by controlling the image pick-up device; and a display switching unit switching, responsive to the detection unit detecting that the user is facing sideways with respect to the apparatus, display of the display device to a screen image different from the operation screen image.

According to a second aspect, the present invention provides an authentication device provided on an apparatus as an object of operation for authorizing a user of the apparatus, including: a display device configured to display information; an authentication processing unit configured to execute an authentication process for the user; a first display control unit causing, responsive to the authentication processing unit having authenticated the user, the display device to display an operation screen image to be operated by the user; an image pick-up device configured to pick-up an image of the user authenticated by the authentication processing unit; a feature information acquiring unit configured to acquire feature information of the user by using the image pick-up device; a detection unit configured to detect expiration of a prescribed time period without any operation of the operation screen image by the user; a switching unit switching, responsive to the detection unit detecting expiration of the prescribed time period without any operation of the operation screen image by the user, display of the display device to a screen image different from the operation screen image; a tracking unit configured to track, responsive to switching of display by the switching unit, the user based on the acquired feature information, by controlling the image pick-up device; a second display control unit causing, responsive to the tracking unit detecting the user returning to a position where the user can operate the apparatus without interruption of tracking, the display device to display the operation screen image; and a cancelling unit configured to execute, responsive to the tracking unit detecting interruption of tracking, a process of cancelling authentication for the user.

According to a third aspect, the present invention provides an authentication device provided on an apparatus as an object of operation for authorizing a user of the apparatus, including: a display device configured to display information; a reading unit configured to read user information from a storage medium storing the user information; an authentication processing unit configured to execute an authentication process for the user based on the user information read by the reading unit; a first display control unit causing, responsive to the authentication processing unit authenticating the user, the display device to display an operation screen image to be operated by the user as long as the storage medium is placed at a position allowing reading of the user information of the storage medium; an image pick-up device configured to pick-up an image of the user authenticated by the authentication processing unit; a feature information acquiring unit configured to acquire feature information of the user by using the image pick-up device; a switching unit switching, responsive to the user information of the storage medium becoming unreadable as the storage medium is moved away from the reading unit, display of the display device to a screen image different from the operation screen image; a tracking unit configured to track, responsive to the switching unit switching the display, the user based on the acquired feature information, by controlling the image pick-up device; a second display control unit causing, responsive to the tracking unit detecting the user returning to a position where the user can operate the apparatus without interruption of tracking, the display device to display the operation screen image; and a cancelling unit configured to execute, responsive to the tracking unit detecting interruption of tracking, a process of cancelling authentication for the user.

According to a fourth aspect, the present invention provides an image forming apparatus including the authentication device according to the first, second or third aspect described above; and an image forming unit configured to form an image in accordance with an operation by the user authenticated by the authentication device.

As described above, the present invention provides an authentication apparatus and an image forming apparatus capable of alleviating the trouble of re-authentication.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a flowchart representing a control structure of a program executed by the image forming apparatus shown in FIG. 11.

DESCRIPTION OF THE PREFERRED EMBODIMENTS

Figure 1:
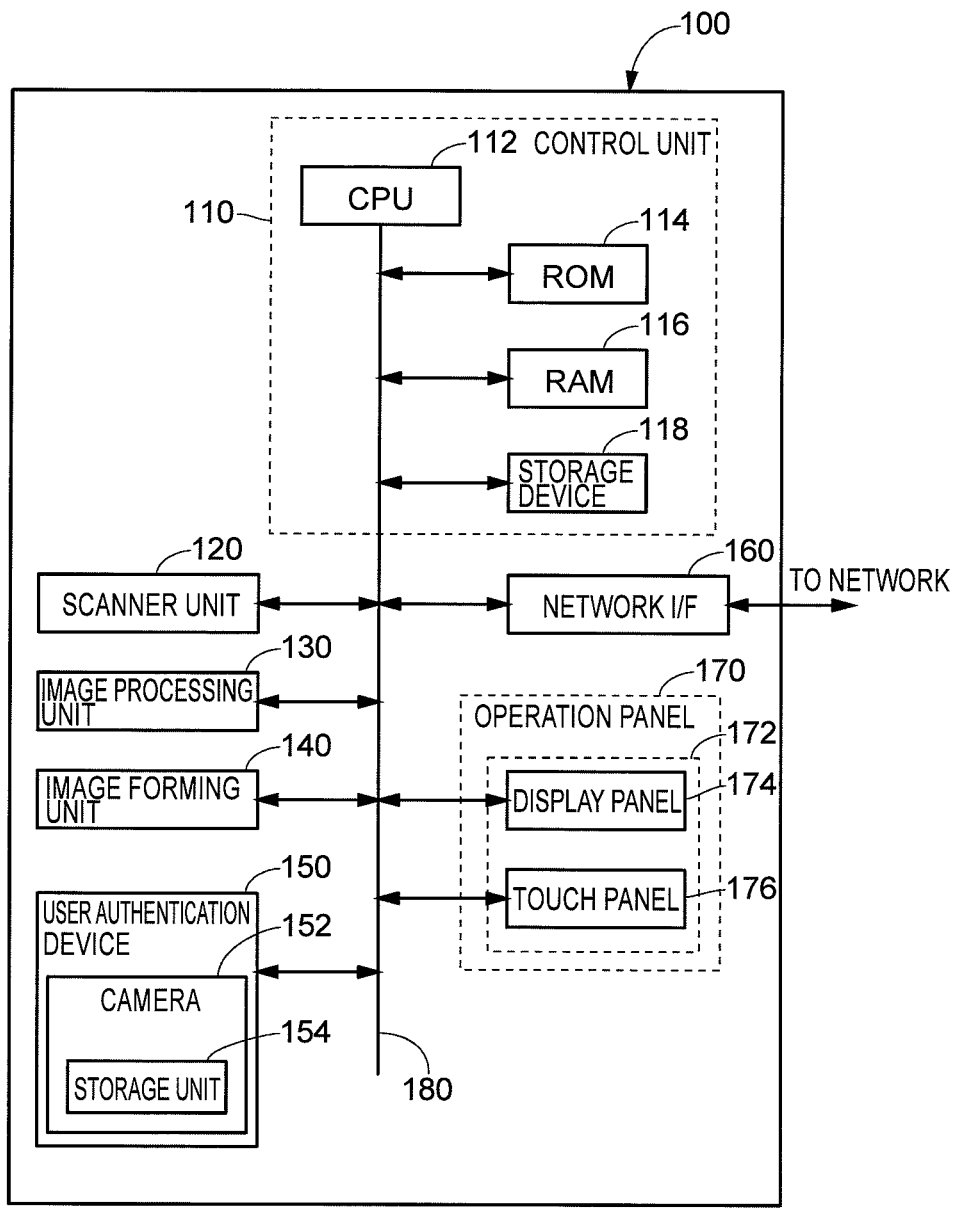
FIG. 1 is a control block diagram showing a hardware configuration of an image forming apparatus in accordance with a first embodiment of the present invention.

In the embodiments described in the following, the same components are denoted by the same reference characters. Their functions and names are also the same. Therefore, detailed descriptions thereof will not be repeated.

First Embodiment

Referring to FIG. 1, an image forming apparatus 100 in accordance with a first embodiment of the present invention is a multifunctional peripheral (MFP) having, by way of example, a copy function, a scanner function and a printer function. Image forming apparatus 100 has a so-called laser type (electro-photographic) printing function, using a laser beam for exposure. The apparatus, however, may have a different type printing function.

Image forming apparatus 100 includes a user authentication device 150 for user authentication. When a user is authenticated by executing a log-in process, user authentication device 150 displays an operation screen image allowing user operation, on an operation panel 170 (touch-panel display 172), which will be described later. User authentication device 150 monitors the logged-in user by a camera, and when the logged-in user moves away from image forming apparatus 100, it switches the screen image from the operation screen image to a log-in screen image. When the logged-in user returns to a position where operation of image forming apparatus 100 is possible, user authentication device 150 again displays the operation screen image mentioned above.

[Hardware Configuration]

Image forming apparatus 100 in accordance with the present embodiment includes a control unit 110, a scanner unit 120, an image processing unit 130, an image forming unit 140, user authentication device 150, a network interface (hereinafter "interface" will be denoted as "I/F") 160 and operation panel 170.

Control unit 110 is substantially a computer, including a CPU (Central Processing Unit) 112, an ROM (Read-Only Memory) 114, an RAM (Random Access Memory) 116 and a storage device 118. Storage device 118 is non-volatile storage retaining data even when power supply is stopped and, by way of example, it is a hard disk drive or a flash memory. CPU 112 is connected to a bus line 180. To bus line 180, ROM 114, RAM 116 and storage device 118 are electrically connected. CPU 112 executes various computer programs in accordance with an instruction from operation panel 170 and the like, and thereby executes desired processes such as operations of various parts and units of image forming apparatus 100 and communication with an external apparatus such as an information processing apparatus (not shown). The various computer programs mentioned above are stored in advance in ROM 114 or storage device 118 and when a desired process is to be executed, read from ROM 114 or storage device 118 and transferred to RAM 116. CPU 112 reads and interprets a program instruction from RAM 116 at an address designated by a value stored in a register, referred to as a program counter, not shown, in CPU 112. Further, CPU 112 reads data necessary for an operation from an address designated by the read instruction and executes an operation corresponding to the instruction on the data. The result of execution is also stored in an address designated by the instruction in a register in CPU 112, storage device 118 or RAM 116.

In storage device 118, a computer program for realizing general operations of image forming apparatus 100 is stored. The computer program is provided from, for example, an information processing apparatus through a network and network I/F 160. The computer program may be provided through a recording medium such as a DVD recording the computer program. Specifically, the DVD as a recording medium of the computer program may be loaded to a built-in DVD drive (not shown) of image forming apparatus 100, and the computer program may be read from the DVD and installed in storage device 118. Storage device 118 also stores various data including image data.

To bus line 180, scanner unit 120, image processing unit 130, image forming unit 140, user authentication device 150, network I/F 160 and operation panel 170 are also electrically connected.

Scanner unit 120 includes a document detection sensor and a CCD (Charge Coupled Device) line sensor (both not shown). The document detection sensor irradiates an image bearing surface of a document placed on a platen (not shown) manually by the user or by an automatic document feeder (not shown) with light from a light source (not shown), and forms an image of reflected light on a CCD line sensor. The CCD line sensor successively executes photoelectric conversion of the thus formed image of reflected light and outputs the resulting image data to image processing unit 130. Specifically, at the time of copying or scanning of the document, scanner unit 120 reads image information by the document detection sensor from the document placed on the platen, converts the read image information to electric signals by means of the CCD line sensor, and outputs the result as image data to image processing unit 130.

Image processing unit 130 includes an MPU (Micro Processing Unit, not shown). Image processing unit 130 performs various processes including a prescribed image processing such as rasterizing, on the image data received from scanner unit 120, image processing apparatus or the like to form print data of a prescribed tone, and outputs it to image forming unit 140.

Image forming unit 140 prints the image represented by the image data in a single color or colors on a sheet of recording paper, and it includes, by way of example, a photoreceptor drum, a charger, a laser scan unit (LSU), a developer, a transfer device, a cleaning device, a fixing device, and a neutralizer. Image forming unit 140 is provided with a conveyor path, for example, along which a sheet of recording paper fed from a paper feed unit (not shown) is conveyed. The paper feed unit draws sheets of recording paper contained in a paper feed cassette (not shown) or placed on a manual feed tray one by one and feeds the sheets to the conveyor path of image forming unit 140. While the sheet of recording paper is fed along the conveyor path of image forming unit 140, the sheet passes between the photoreceptor drum and the transfer device and further passes through the fixing device, whereby printing is done on the sheet of recording paper.

The photoreceptor drum rotates in one direction. The surface of photoreceptor drum is cleaned by the cleaning device and the neutralizer, and thereafter it is uniformly charged by the charger. The laser scan unit modulates a laser beam based on the image data as the object of printing, and repeatedly scans the surface of photoreceptor drum with the laser beam in the main scanning direction, whereby a latent electrostatic image is formed on the surface of photoreceptor drum. The developer supplies toner to the surface of photoreceptor drum to develop the latent electrostatic image and thereby forms a toner image on the surface of photoreceptor drum. The transfer device transfers the toner image on the surface of photoreceptor drum to the sheet of recording paper passing between the transfer device and the photoreceptor drum.

The fixing device includes a heating roller for heating the sheet of recording paper and a pressure roller for pressing the sheet of recording paper. The sheet of recording paper is heated by the heating roller and pressed by the pressure roller, whereby the toner image transferred to the sheet of recording paper is fixed thereon. The sheet of recording paper discharged from the fixing device (printed sheet) is discharged to a discharge tray.

User authentication device 150 executes the log-in and log-out processes for the user under the control of CPU 112. User authentication device 150 includes a camera device 152 picking-up an image of the authenticated user (hereinafter referred to as "logged-in user"). Camera device 152 includes a digital camera module provided with an image pick-up device (imaging element). Camera device 152 is arranged at such a position that enables image pick-up of the head of a user operating image forming apparatus 100. After authentication, camera device 152 picks up the image of the logged-in user and from the picked-up image, extracts feature data of parts to be noted, by image processing. Camera device 152 includes a storage unit 154 for storing the extracted data. Camera device 152 may be any device that can acquire rough feature data.

In the present embodiment, user authentication device 150 acquires the head (head size) of the user picked-up at the time of authentication as the feature data, and stores it in storage unit 154. In storage unit 154, a threshold value for determining whether the logged-in user is at a position sufficiently close to image forming apparatus 100 or away from image forming apparatus 100 using the feature data is stored in advance. A position sufficiently close to image forming apparatus 100 means, for example, a position where the user can operate image forming apparatus 100 (typical position for operation). Immediately after the user authentication, the logged-in user is at a position where he/she can operate image forming apparatus 100. Therefore, the feature data stored in storage unit 154 serves as reference data for determining whether the logged-in user is close to image forming apparatus 100 or away from image forming apparatus 100.

In the present embodiment, when image forming apparatus 100 is activated, a log-in screen image is displayed on operation panel 170 (touch-panel display 172). The user logs in by entering a log-in name and a password on the log-in screen image.

Network I/F 160 provides an interface with a network. Image forming apparatus 100 is capable of data communication in accordance with a prescribed communication protocol with an information processing apparatus or the like on a network through network I/F 160. Image forming apparatus 100 is capable of receiving instruction signals instructing execution of various processes such as a print job, from an information processing apparatus through network I/F 160.

Operation panel 170 includes a touch-panel display 172. Touch-panel display 172 is a touch-panel integrated liquid crystal display formed by stacking a display panel 174 and a touch-panel 176. Display panel 174 provides the user with various pieces of information related to the state of image forming apparatus 100 and states of various processes. Touch-panel display 172 also provides an interactive operation interface (user interface) for the user. The interactive operation interface receives instructions by the user related to the overall operation of image forming apparatus 100 through touch-panel 176, displays the contents of instructions on display panel 174, and outputs control signals in accordance with the instructions to control unit 110 or to the MPU of image processing unit 130.

[Software Configuration]

Figure 2:
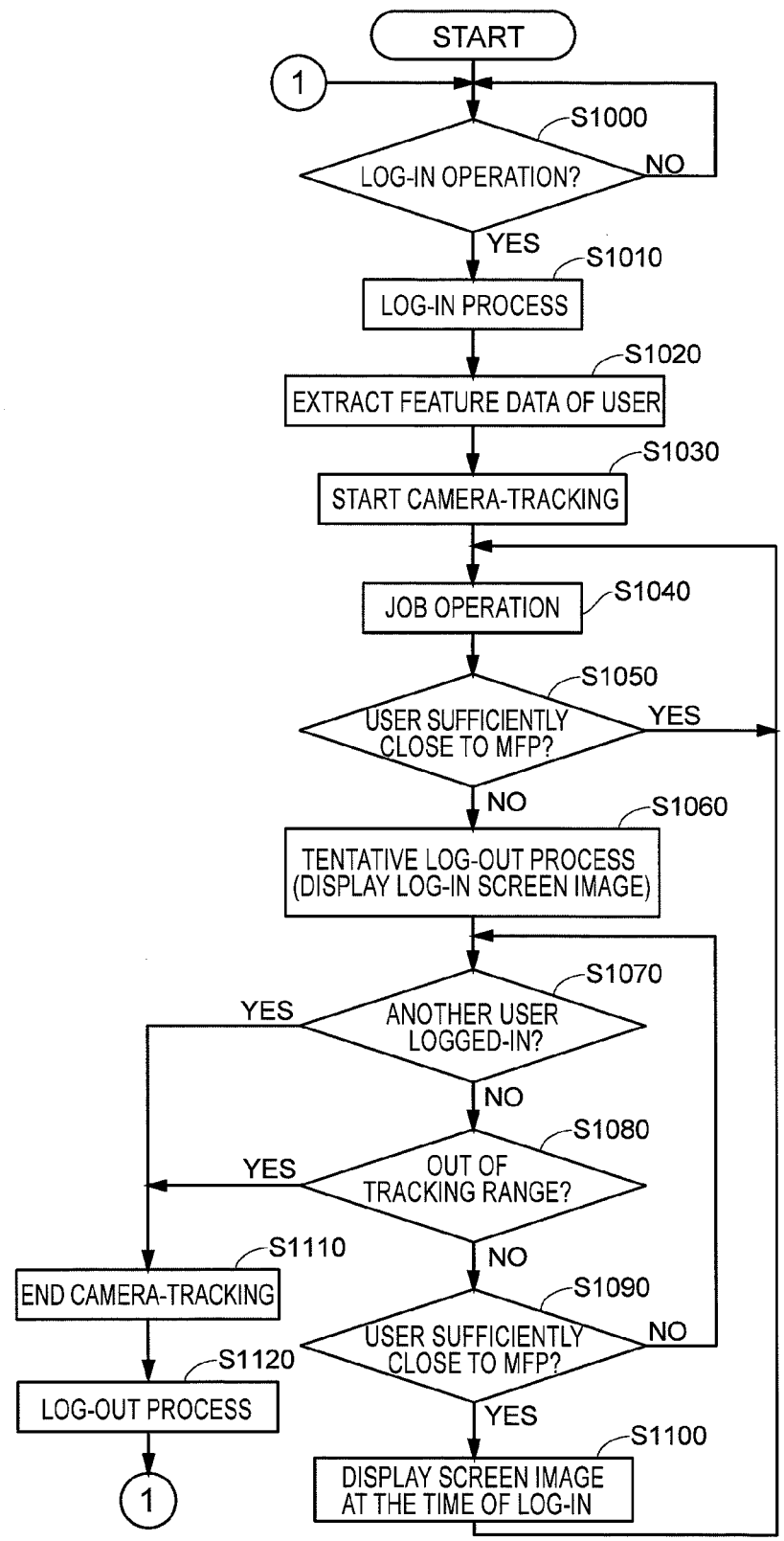
FIG. 2 is a flowchart representing a control structure of a program executed by the image forming apparatus shown in FIG. 1.

Referring to FIG. 2, control structure of a computer program executed by image forming apparatus 100 for user authentication process will be described. The program is activated when image forming apparatus 100 is activated.

The program includes a step S1000 of determining whether the log-in operation has been done and waiting until the log-in operation is done; and a step 1010 executed if it is determined at step S1000 that the log-in operation has been done, of executing a normal log-in process.

Figure 3:
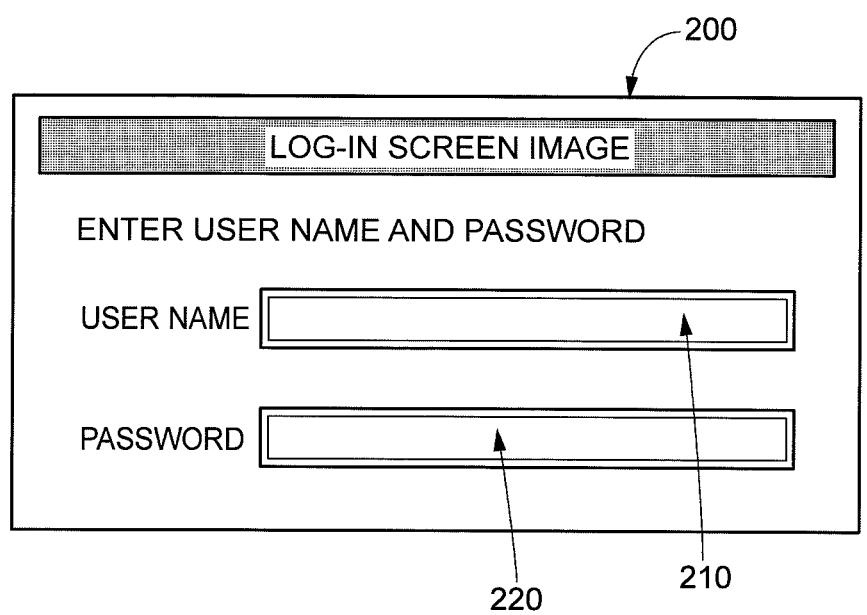
FIG. 3 shows an example of a log-in screen image displayed on an operation panel of the image forming apparatus shown in FIG. 1.

When image forming apparatus 100 is activated, a log-in screen image 200 shown in FIG. 3 is displayed on touch-panel display 172. Referring to FIG. 3, log-in screen image 200 includes an entry field 210 for entering a user name, and an entry field 220 for entering a password. The user enters the user name and the password to entry fields 210 and 220, respectively, and thereby executes log-in. In the following, it is assumed that user authentication has been successfully done by the log-in process at step S1010. After user authentication, image forming apparatus 100 displays a screen image allowing user to operate, on touch-panel display 172, in place of log-in screen image 200.

Again referring to FIG. 2, the program further includes: a step S1020, executed following step S1010, of picking-up an image of the logged-in user and extracting feature data of the logged-in user by controlling camera device 152; a step S1030, executed following step S1020, of camera-tracking user movement by controlling camera device 152; a step S1040, executed following step S1030, of receiving input of a job operation by the logged-in user; and a step S1050, executed following step S1040, of determining whether the logged-in user is sufficiently close to image forming apparatus 100 (MFP), and branching the flow of control depending on the result of determination. If it is determined at step S1050 that the logged-in user is sufficiently close to image forming apparatus 100 (MFP), the control returns to step S1040.

At step S1020, by way of example, at a timing of the end of log-in process, camera device 152 picks up an image of the logged-in user, and by image processing, the head of logged-in user is extracted as feature data. User authentication device 150 tracks the logged-in user based on the acquired feature data. Specifically, image forming apparatus 100 tracks, by the camera, movement of the head of logged-in user obtained as the feature data, by controlling camera device 152. At step S1040, a job is executed in accordance with the job operation by the logged-in user. The logged-in user may make a transition to a desired screen image and execute a job operation, by operating operation panel 170.

At step S1050, the feature data (head size) stored in storage unit 154 is compared with the current feature data that is camera-tracked. If the current feature data becomes smaller than a threshold value stored in storage unit 154, image forming apparatus 100 determines that the logged-in user is not sufficiently close to image forming apparatus 100 (MFP), that is, he/she has moved away from image forming apparatus 100. More specifically, when logged-in user moves away from image forming apparatus 100, the size of logged-in user's head becomes smaller than when he/she is close to image forming apparatus 100. Therefore, when the head size becomes smaller than the feature data acquired in advance (head data stored in storage unit 154) by a certain percentage, image forming apparatus 100 determines that the logged-in user has moved away from image forming apparatus 100.

The program further includes a step S1060, executed if it is determined at step S1050 that the logged-in user has moved away from image forming apparatus 100, of performing the log-out process. At step S1060, though the logged-in state is retained (stored) internally, the log-in screen image allowing a different user to log-in is displayed. Specifically, at step S1060, the display on touch-panel display 172 is switched to the log-in screen image, while the logged-in state is not discarded. Such a log-out process will be hereinafter referred to as "tentative log-out process," in order to distinguish from the normal log-out process.

The program further includes: a step S1070, executed following step S1060, of determining whether or not a different user has logged-in, and branching the flow of control depending on the result of determination; a step S1080, executed if it is determined at step S1070 that a different user is not logged in, of determining whether the logged-in user is out of a range of camera-tracking, and branching the flow of control depending on the result of determination; a step S1090, executed if it is determined at step S1080 that user is within the range of camera-tracking, of determining whether the logged-in user is sufficiently close to image forming apparatus 100 (MFP), and branching the flow of control depending on the result of determination. If it is determined at step S1090 that the logged-in user is not sufficiently close to image forming apparatus 100 (MFP), that is, the logged-in user is away from image forming apparatus 100, the control returns to step S1070.

At step S1080, if the user is out of the range of image pick-up by camera device 152, or if the head of logged-in user becomes smaller than the threshold value stored in storage unit 154, image forming apparatus 100 determines that it is out of the range of camera-tracking. At step S1090, in the similar manner as at step S1050, whether the logged-in user is sufficiently close to image forming apparatus 100 (MFP) or not is determined.

The program further includes: a step S1100, executed if it is determined at step S1090 that the logged-in user is sufficiently close to image forming apparatus 100 (MFP), of displaying the screen image at the time of log-in on touch-panel display 172 and returning the control to step S1040; a step S1110, executed if it is determined at step S1070 that a different user has logged-in, or if it is determined that it is out of the range of camera-tracking, of ending the camera-tracking; and a step S1120, executed following step S1110, of executing the log-out process and returning the control to step S1000.

If it is determined that a different user has logged in at step S1070, it is determined at step S1000 that a log-in operation is done, and the same process steps as described above are repeated regarding the different user as the logged-in user.

[Operation]

Image forming apparatus 100 in accordance with the present embodiment operates in the following manner. In the following, only those portions of operations of image forming apparatus which are related to the present invention will be described. Other operations are the same as those of the conventional image forming apparatus.

On touch-panel display 172 of image forming apparatus 100, a log-in screen image 200 shown in FIG. 3 is displayed. When a user enters a user name and a password to log-in screen image 200 (YES at step S1000 of FIG. 2), user authentication device 150 executes the log-in process (step S1010). After a successful log-in by user authentication, image forming apparatus 100 picks up an image of the logged-in user by controlling camera device 152, and extracts the head of logged-in user as feature data. User authentication device 150 stores the extracted feature data in storage unit 154 (step S1020).

Image forming apparatus 100 tracks the movement of logged-in user's head obtained as the feature data, by controlling camera device 152. The logged-in user operates a screen image displayed after the log-in, to instruct a job to image forming apparatus 100. By way of example, the logged-in user operates operation panel 170 to make a transition to an operation screen image 300 shown in FIG. 4, and conducts a job operation on operation screen image 300.

Figure 4:
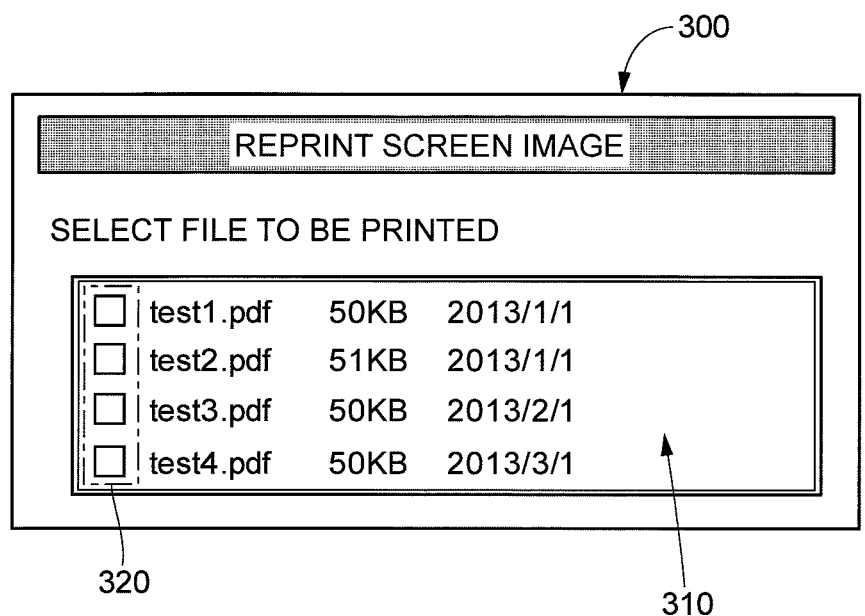
FIG. 4 shows an example of an operation screen image displayed on the operation panel of the image forming apparatus shown in FIG. 1.

Referring to FIG. 4, operation screen image 300 is a screen image for re-printing allowing selection of a file to be printed, when an image of a file stored in storage device 118 is to be re-printed. Operation screen image 300 includes an area 310 displaying a list of re-printable files, and check boxes to be checked for selecting a file to be re-printed.

Image forming apparatus 100 determines whether or not the logged-in user has moved away from image forming apparatus 100 by tracking the movement of logged-in user (step S1050). If it is detected that the logged-in user has moved away from image forming apparatus 100 (NO at step S1050), user authentication device 150 executes the tentative log-out process, and displays a log-in screen image 250 shown in FIG. 5 on touch-panel display 172 (step S1060). Log-in screen image 250 is the same as log-in screen image 200 shown in FIG. 3. Specifically, when the logged-in user ends a desired process and moves away from image forming apparatus 100, image forming apparatus 100 automatically executes the log-out process. In the tentative log-out process, different from the normal log-out process, the logged-in state is retained (stored) internally. It is noted, however, that since log-in screen image 250 is displayed on touch-panel display 172, any other user is requested to log-in before using the image forming apparatus 100. Therefore, no other user can use image forming apparatus 100 by the name of previous user.

If it is detected by camera-tracking that the logged-in user once having moved away from image forming apparatus has returned close to image forming apparatus 100 (to a position where he/she can operate the apparatus) while the tracking is continued successfully without interruption (with the user never gone out of the tracking range) (YES at step S1090), image forming apparatus 100 displays the screen image at the time of log-in on touch-panel display 172 (step S1100). If it is the operation screen image 300 (see FIG. 4) that was displayed immediately before the log-in screen image 250 was displayed (immediately before the logged-in user moved away from image forming apparatus 100), image forming apparatus 100 displays the operation screen image 300 as the screen image at the time of log-in, on touch-panel display 172. In this manner, if the tracked user again comes close to image forming apparatus 100, image forming apparatus displays the screen image that was used previously on operation panel 170, skipping the log-in process.

On the other hand, if the object of tracking goes out of the range of tracking during camera-tracking (YES at step S1080), or if a different user logs in (YES at step S1070), image forming apparatus 100 discards the logged-in state stored at the time of tentative log-out process.

Specifically, if it is determined that after the logged-in user moved away from image forming apparatus 100, the camera-tracking is interrupted (the user goes out of the range of tracking) (YES at step S1080), camera-tracking is terminated (step S1110), and the image forming apparatus 100 executes the normal log-out process (step S1120). Further, if the log-in screen image 250 is displayed as the tentative log-out process and a different user logs in using the log-in screen image 250 (YES at step S1070), the camera-tracking is terminated (step S1110) and image forming apparatus 100 executes the normal log-out process (step S1120). Here, the said different user becomes the new logged-in user and the same operation as described above is repeated. When the normal log-out process is executed (step S1120), image forming apparatus 100 displays log-in screen image 200 shown in FIG. 3 on touch-panel display 172.

[Functions and Effects]

As can be seen from the foregoing, use of image forming apparatus 100 in accordance with the present invention attains the following effects.

Image forming apparatus 100 picks up an image of a logged-in user and thereby acquires feature data of the logged-in user. Based on the thus acquired feature data, it becomes possible to detect whether the logged-in user has moved away from image forming apparatus 100 and to detect whether he/she comes close to image forming apparatus 100. When it is detected that the logged-in user has moved away from image forming apparatus 100, image forming apparatus 100 executes the tentative log-out process and displays log-in screen image 250. By displaying log-in screen image 250, image forming apparatus 100 requires any other user of log-in before using image forming apparatus 100. Therefore, it is possible to prevent any other user from using image forming apparatus 100 using the user name of the previous user. In addition, when the logged-in user forgets to do the log-out operation, it is possible to prevent any other user from using image forming apparatus 100 using the user name of the previous user.

Further, if it is determined that the logged-in user having moved away from image forming apparatus 100 has returned close to image forming apparatus 100 while the tracking is not interrupted, image forming apparatus 100 displays the operation screen image again. Thus, the logged-in user can operate the operation screen image without the necessity of repeating the log-in operation again. Thus, the trouble of re-login can be reduced. Further, since repeated log-in becomes unnecessary, convenience for the user can be improved.

In the tentative log-out process, internally, the log-in state of the logged-in user is stored. Therefore, when the logged-in user returns close to image forming apparatus 100, it is possible to resume the operation from the operation screen image that has been displayed immediately before the display of log-in screen image 250. This further improves user convenience.

If the logged-in user returns to the position where he/she can operate image forming apparatus 100 without any interruption of tracking, the operation screen image is displayed again, while the log-out process is executed if the tracking is interrupted. In order to recognize the logged-in user again if tracking is interrupted, an expensive camera device capable of face recognition, for example, becomes necessary. In image forming apparatus 100, if the tracking is interrupted, the log-out process is executed as described above and, therefore, it is unnecessary to recognize the logged-in user again. Thus, a relatively inexpensive camera device that tracks movement of an object can be used as camera device 152.

Second Embodiment

The image forming apparatus in accordance with the present embodiment detects, when a logged-in user is close to the image forming apparatus (at a position where he/she can operate the image forming apparatus), whether the logged-in user and another user are positioned over one another. Specifically, the image forming apparatus detects whether there is another user close to the logged-in user, using the camera-tracking function, in order to avoid mixture of the logged-in user and another user.

When the logged-in user is close to the image forming apparatus and another user uses the image forming apparatus, it is possible that the said another user may use the image forming apparatus by the name of the previous user. Assume, for example, that a logged-in user is operating the image forming apparatus and another user comes close to the logged-in user who is operating. If the head of the logged-in user and the head of another user overlaps, the head (feature data) tracked by the camera can be switched from the logged-in user to the said another user. In such a situation, even if the logged-in user moves away from the image forming apparatus, the tentative log-out process is not executed if the said another user stays near the image forming apparatus. Then, another user can use the image forming apparatus using the user name of the previous user.

Therefore, in the present embodiment, if overlapping of the head of logged-in user (feature data) and the head of another user is detected while the logged-in user is close to the image forming apparatus, the image forming apparatus executes the tentative log-out process.

The image forming apparatus in accordance with the present embodiment has the same hardware configuration as image forming apparatus 100 in accordance with the first embodiment except that the camera device (user authentication device) is capable of detecting overlapping of users. It is noted, however, that in the image forming apparatus, the program and the like stored in ROM 114 of control unit 110 or storage device 118 are different from those of the first embodiment.

[Software Configuration]

Figure 6:
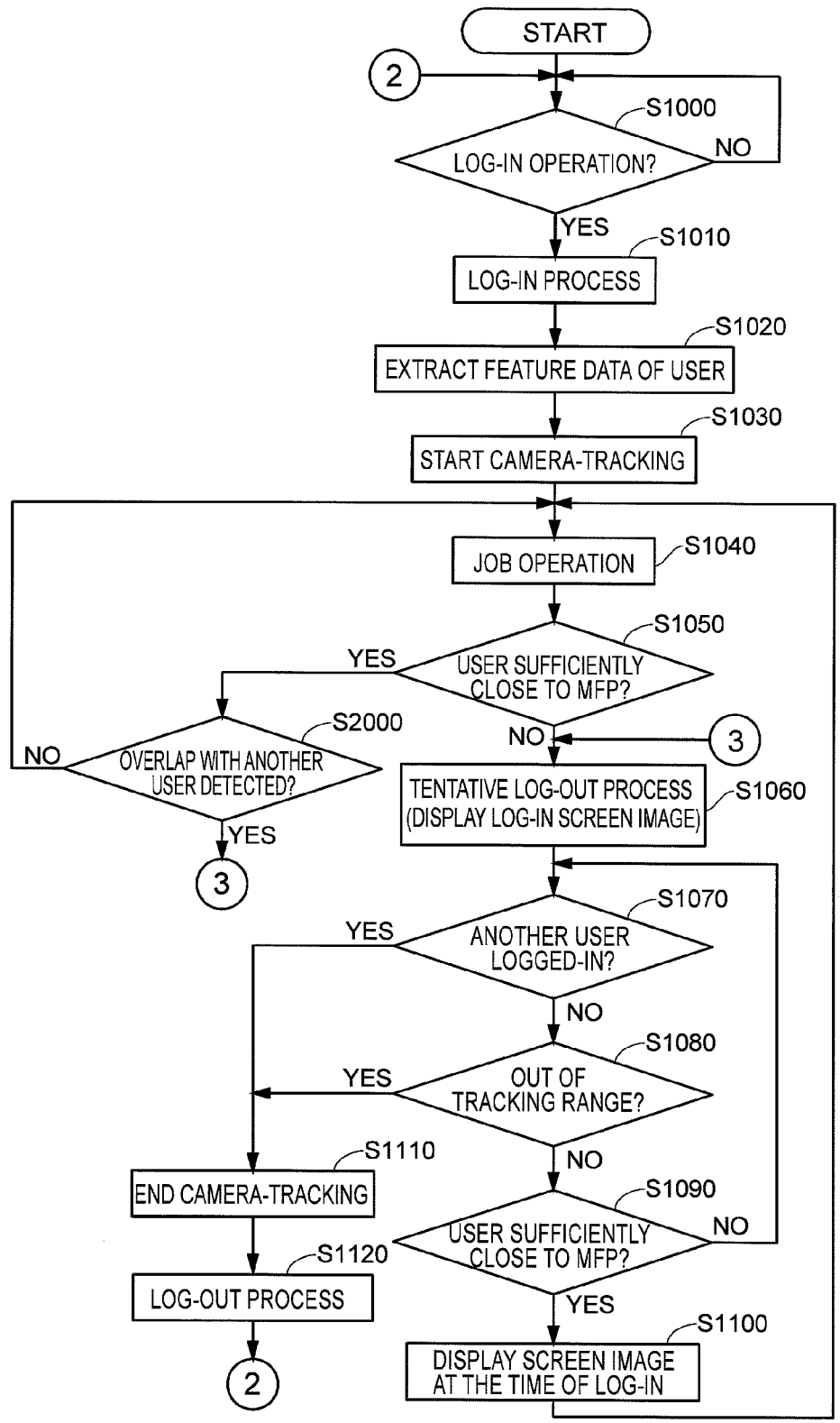
FIG. 6 is a flowchart representing a control structure of a program executed by an image forming apparatus in accordance with a second embodiment of the present invention.

In the image forming apparatus in accordance with the present embodiment, the program shown in FIG. 6 is executed, in place of the program shown in FIG. 2. In the program shown in FIG. 6, processes other than the process at step S2000 are the same as those executed by the computer program shown in FIG. 2. In the following, the difference will be described.

Referring to FIG. 6, the program includes a step S2000, executed if it is determined at step S1050 that the logged-in user is sufficiently close to the image forming apparatus (MFP), of determining whether overlapping of the logged-in user and another user is detected, and branching the flow of control depending on the result of determination. If it is determined at step S2000 that overlapping with another user is detected, the control proceeds to step S1060. On the other hand, if it is determined at S2000 that overlapping with another user is not detected, the control returns to step S1040.

[Operation]

The image forming apparatus according to the present embodiment operates in the following manner. It is noted that operations other than the operation of detecting overlapping with another user are the same as those of the first embodiment. Therefore, detailed description of similar operations will not be repeated.

The image forming apparatus tracks by the camera the movement of logged-in user to determine whether the logged-in user has moved away from the image forming apparatus (step S1050). If it is determined that the logged-in user has not moved away from the image forming apparatus (he/she stays sufficiently close to the image forming apparatus) (YES at step S1050), the image forming apparatus determines whether the user authentication device detected a state in which the logged-in user and another user are overlapping (step S2000). The user authentication device (camera device) determines whether the head of another user is positioned close to the head of the logged-in user (the head that is being tracked). By way of example, whether the head of the logged-in user overlaps with the head of another user is determined. If it is determined that the head of another user is positioned close to the head of the logged-in user, the user authentication device (camera device) determines that overlapping of the logged-in user and another user is detected.

Figure 5:
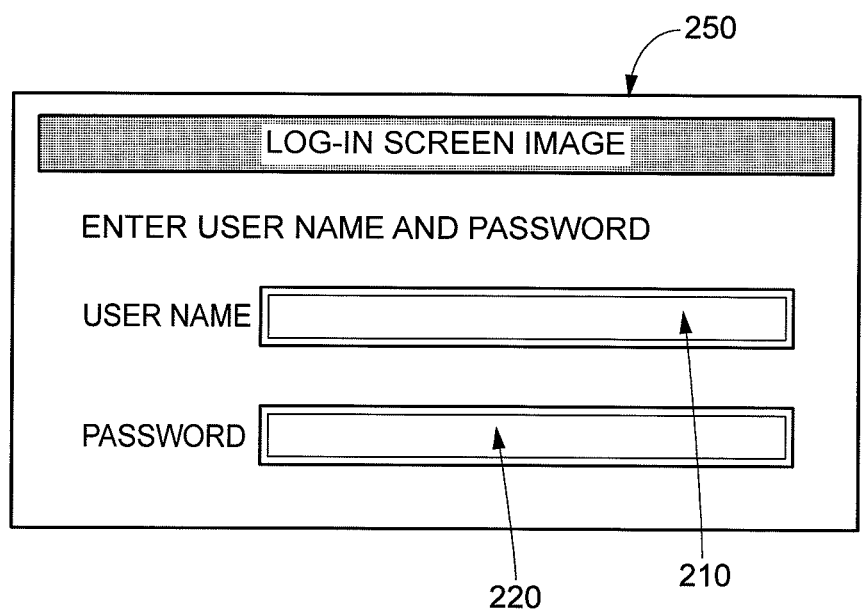
FIG. 5 shows an example of a log-in screen image displayed on an operation panel of the image forming apparatus shown in FIG. 1.

When overlapping of the logged-in user and another user is detected (YES at step S2000), the user authentication device executes the tentative log-out process, and displays the log-in screen image 250 shown in FIG. 5 on touch-panel display 172 (step S1060). If overlapping of the logged-in user and another user is not detected (NO at step S2000), the image forming apparatus executes a job in accordance with the job operation by the logged-in user (step S1040).

As can be clearly seen from the foregoing, use of the image forming apparatus in accordance with the present invention attains the following effects.

While the logged-in user is close to the image forming apparatus (at a position where he/she can operate the image forming apparatus), by detecting whether the logged-in user is overlapping with another user, the image forming apparatus can effectively prevent another user from using the image forming apparatus by the user name of the previous user.

Other functions and effects are the same as those of the first embodiment.

Third Embodiment

The image forming apparatus in accordance with the present embodiment is set at a position allowing the camera device to recognize the face of the user. The camera device (user authentication device) acquires the head (head data) of logged-in user as the feature data, as in the first embodiment. It is noted, however, that in the present embodiment, the camera device (user authentication device) is capable of detecting whether the logged-in user is facing forward to or sideways from the image forming apparatus, based on the acquired feature data (head data) and, in this point, it is different from the first embodiment.

When operating the image forming apparatus, the logged-in user faces forward to the image forming apparatus, or front-facing. The present image forming apparatus determines whether or not the logged-in user is front-facing the image forming apparatus using the camera-tracking function, and if he/she faces sideways, it executes the tentative log-out process. If the logged-in user is not front-facing, it means that it is difficult for the logged-in user to operate the image forming apparatus. In such a situation, if the tentative log-out process is executed, it would cause no problem for the logged-in user. Further, by executing the log-out process when the logged-in user is not front-facing, the security level of the image forming apparatus can be improved. For example, it is possible to more effectively prevent another user from using the image forming apparatus using the user name of the previous user.

The image forming apparatus in accordance with the present embodiment has the same hardware configuration as image forming apparatus 100 in accordance with the first embodiment except that the camera device (user authentication device) is capable of detecting the direction of user's face. It is noted, however, that in the image forming apparatus, the program and the like stored in ROM 114 of control unit 110 or storage device 118 are different from those of the first embodiment.

[Software Configuration]

Figure 7:
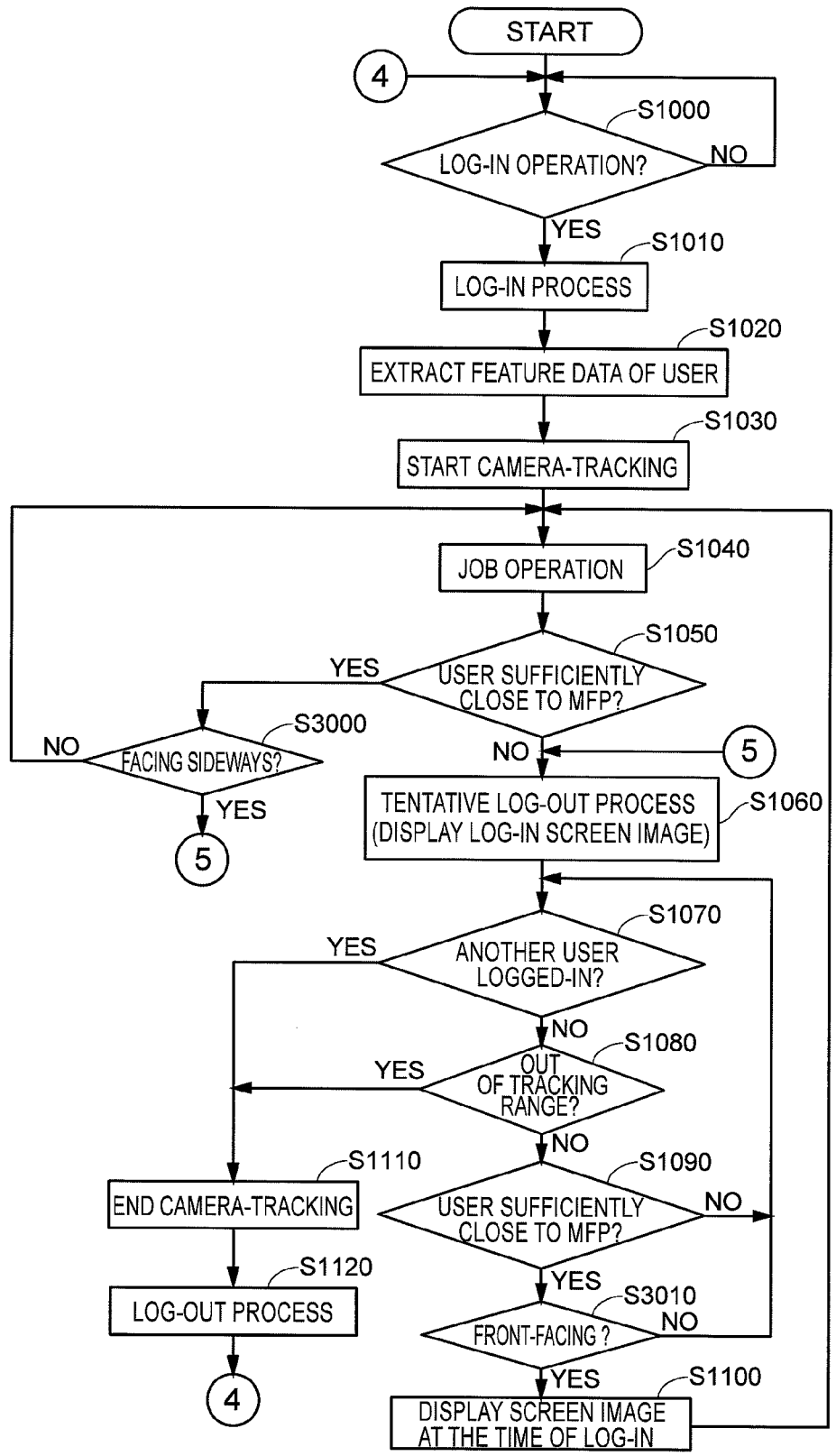
FIG. 7 is a flowchart representing a control structure of a program executed by an image forming apparatus in accordance with a third embodiment of the present invention.

In the image forming apparatus in accordance with the present embodiment, the program shown in FIG. 7 is executed, in place of the program shown in FIG. 2. In the program shown in FIG. 7, processes other than the process at steps S3000 and S3010 are the same as those executed by the computer program shown in FIG. 2. In the following, the difference will be described.

Referring to FIG. 7, the program includes a step S3000, executed if it is determined at step S1050 that the logged-in user is sufficiently close to the image forming apparatus (MFP), of determining whether the face of logged-in user is sideways to the image forming apparatus, and branching the flow of control depending on the result of determination. If it is determined at step S3000 that the logged-in user is facing sideways, the control proceeds to step S1060. If it is determined at step S3000 that the logged-in user is not facing sideways, that is, he/she is front-facing, the control returns to step S1040.

The program further includes a step S3010, executed if it is determined at step S1090 that the logged-in user is sufficiently close to the image forming apparatus (MFP), of determining whether the logged-in user is front-facing to the image forming apparatus, and branching the flow of control depending on the result of determination. If it is determined at step S3010 that the logged-in user is front-facing, the control proceeds to step S1100. On the other hand, if it is determined at step S3010 that the logged-in user is not front-facing, that is, facing sideways, the control returns to step S1070.

[Operation]

The image forming apparatus according to the present embodiment operates in the following manner. It is noted that operations other than the operation of detecting whether the user is facing forward or sideways to the image forming apparatus are the same as those of the first embodiment. Therefore, detailed description of similar operations will not be repeated.

The image forming apparatus tracks by the camera the movement of logged-in user to determine whether the logged-in user has moved away from the image forming apparatus (step S1050). If it is determined that the logged-in user has not moved away from the image forming apparatus (he/she stays sufficiently close to the image forming apparatus) (YES at step S1050), the image forming apparatus determines whether the logged-in user is facing sideways (step S3000). If it is detected that the logged-in user is facing sideways, the user authentication device executes the tentative log-out process, and displays the log-in screen image 250 shown in FIG. 5 on touch-panel display 172 (step S1060). If it is detected that the logged-in user is not facing sideways but front-facing, the image forming apparatus executes a job in accordance with the job operation by the logged-in user (step S1040).

After executing the tentative log-out process (step S1060), the image forming apparatus determines whether or not the logged-in user is sufficiently close to the image forming apparatus (step S1090). If it is determined that the logged-in user is sufficiently close to the image forming apparatus (YES at step S1090), the image forming apparatus determines whether the logged-in user is front-facing. If it is detected that the logged-in user is front-facing (YES at step S3010), the image forming apparatus displays the screen image at the time of log-in (step S1100).

If the logged-in user is facing sideways (YES at step S3000), the tentative log-out process is executed and the log-in screen image 250 is displayed on touch-panel display 172 (step S1060). Thereafter, if the user does not move away from the image forming apparatus (YES at step S1090) and facing forward (YES at step S3010), the image forming apparatus displays the screen image that has been used previously on touch-panel display 172 without the log-in process.

In the present embodiment, even if the logged-in user once having moved away from the image forming apparatus returns close to the image forming apparatus (YES at step S1090) with the tracking not interrupted (with the user never gone out of the range of tracking), the log-in screen image 250 is left displayed until it is detected that the logged-in user is front-facing. If it is detected that the logged-in user is front-facing (YES at step S3010), the image forming apparatus displays the screen image at the time of log-in without the log-in process (step S1100).

Fourth Embodiment

The image forming apparatus in accordance with the present embodiment is configured to enable execution of tentative log-out process even when the logged-in user performed the log-out operation (manual log-out). Whether the tentative log-out process is to be executed or the normal log-out process is to be executed can be switched by setting. Such a setting is possible through a setting screen image displayed on the operation panel (touch-panel display).

Figure 8:
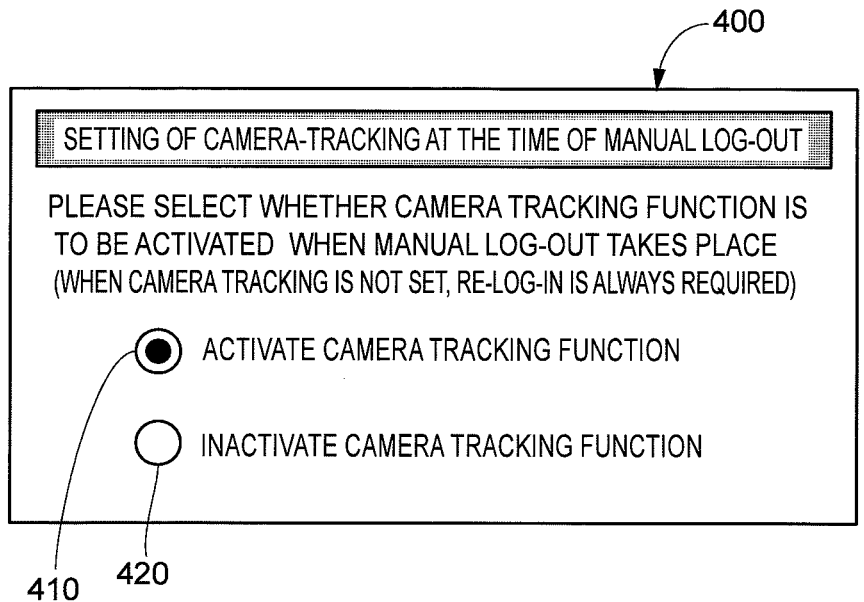
FIG. 8 shows an example of a setting screen image displayed on the operation panel of an image forming apparatus in accordance with a fourth embodiment of the present invention.

FIG. 8 shows an example of such a setting screen image. Referring to FIG. 8, a setting screen image 400 includes a radio button 410 for setting active (valid) the camera-tracking function at the time of manual log-out, and a radio button for setting inactive (invalid) the camera-tracking function at the time of manual log-out. By switching between radio buttons 410 and 420, the camera-tracking function can be set active or inactive.

If the camera-tracking function is set active, the image forming apparatus executes the tentative log-out process even when the logged-in user logs out manually. In the tentative log-out process, the logged-in state is internally maintained (stored). Therefore, if the logged-in user returns to the position where he/she can operate the image forming apparatus with camera-tracking uninterrupted, the operation screen image used previously is displayed on the operation panel without the log-in process. The logged-in user can operate the operation screen image without the necessity of repeating the log-in operation again. On the other hand, if the camera-tracking function is set inactive, when the logged-in user logs out manually, the normal log-out process is executed. Here, the user must log-in again, to operate the operation screen image he/she used previously.

The image forming apparatus in accordance with the present embodiment has the same hardware configuration as image forming apparatus 100 in accordance with the first embodiment. It is noted, however, that in the image forming apparatus, the program and the like stored in ROM 114 of control unit 110 or storage device 118 are different from those of the first embodiment.

[Software Configuration]

Figure 9:
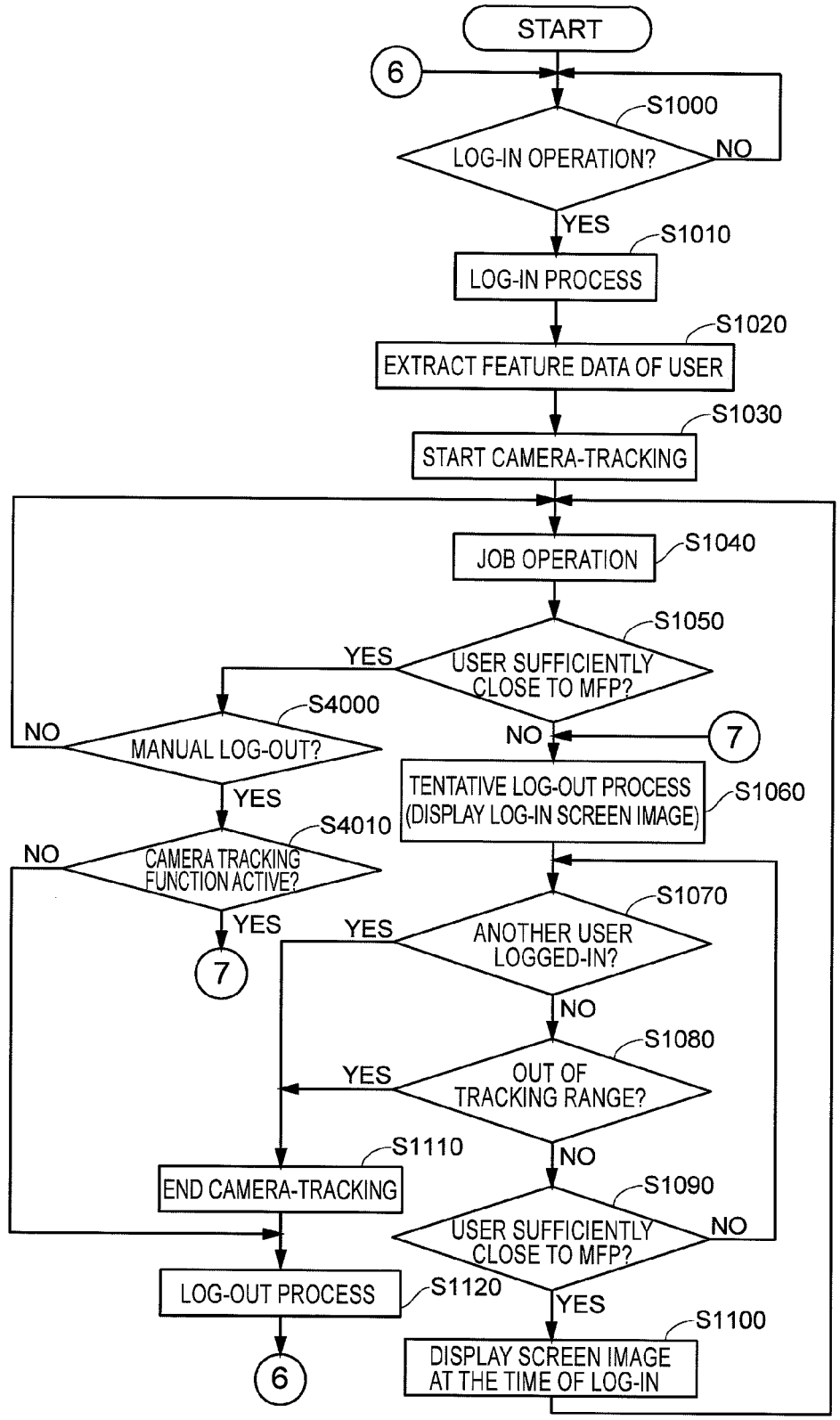
FIG. 9 is a flowchart representing a control structure of a program executed by an image forming apparatus in accordance with a fourth embodiment of the present invention.

In the image forming apparatus in accordance with the present embodiment, the program shown in FIG. 9 is executed, in place of the program shown in FIG. 2. In the program shown in FIG. 9, processes other than the process at steps S4000 and S4010 are the same as those executed by the computer program shown in FIG. 2. In the following, the difference will be described.

Referring to FIG. 9, the program includes a step S4000, executed if it is determined at step S1050 that the logged-in user is sufficiently close to the image forming apparatus (MFP), of determining whether the logged-in user has logged out manually, and branching the flow of control depending on the result of determination; and a step S4010, executed if it is determined at step S4000 that the logged-in user logged-out manually, of determining whether the camera-tracking function is active, and branching the flow of control depending on the result of determination.

At step S4000, if it is determined that the logged-in user has not manually logged-out, the control returns to step S1040. If it is determined at step S4010 that the camera-tracking function is active, the control proceeds to step S1060. On the other hand, if it is determined at step S4010 that the camera-tracking function is not active, that is, inactive, the control proceeds to step S1120.

[Operation]

The image forming apparatus according to the present embodiment operates in the following manner. It is noted that operations other than the log-out operation (manual log-out) by the logged-in user are the same as those of the first embodiment. Therefore, detailed description of similar operations will not be repeated.

The image forming apparatus tracks by the camera the movement of logged-in user to determine whether the logged-in user has moved away from the image forming apparatus (step S1050). If it is determined that the logged-in user has not moved away from the image forming apparatus (he/she stays sufficiently close to the image forming apparatus) (YES at step S1050), the image forming apparatus determines whether manual log-out has been done by the logged-in user (step S4000). If it is determined that the manual log-out has been done (YES at step S4000), the image forming apparatus determines whether or not the camera-tracking function is active (step S4010). If the camera-tracking function is not active, that is, if it is inactive, the image forming apparatus executes the normal log-out operation (step S1120). On the other hand, if the camera-tracking function is active, the image forming apparatus executes the tentative log-out process (step S1060) as when it is detected that the logged-in user has moved away from the image forming apparatus (NO at step S1050), and continues camera-tracking of the logged-in user.

If it is detected that the logged-in user has not moved away from the image forming apparatus (he/she is sufficiently close to the image forming apparatus) and manual log-out is not done by the logged-in user, the image forming apparatus executes a job in accordance with a job operation by the logged-in user (step S1040).

Fifth Embodiment

In the image forming apparatus in accordance with the present embodiment, if a prescribed time expires without any operation after log-in, the tentative log-out process is executed. The prescribed time period can be set as desired. In the present embodiment, the prescribed time period is set, for example, to about 1 to about 3 minutes.

The image forming apparatus in accordance with the present embodiment has the same hardware configuration as image forming apparatus 100 in accordance with the first embodiment. It is noted, however, that in the image forming apparatus, the program and the like stored in ROM 114 of control unit 110 or storage device 118 are different from those of the first embodiment.

[Software Configuration]

Figure 10:
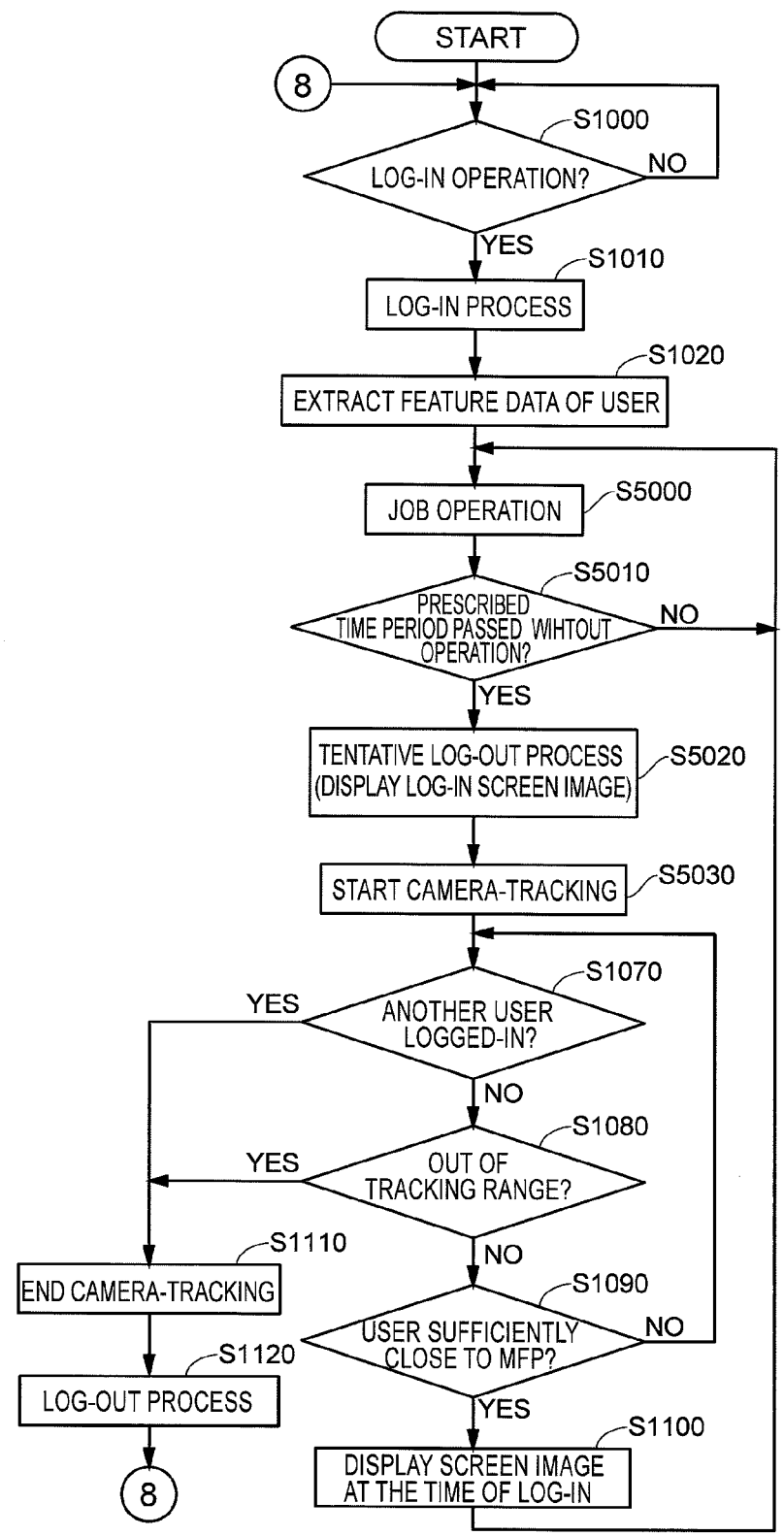
FIG. 10 is a flowchart representing a control structure of a program executed by an image forming apparatus in accordance with a fifth embodiment of the present invention.

In the image forming apparatus in accordance with the present embodiment, the program shown in FIG. 10 is executed, in place of the program shown in FIG. 2. In the program shown in FIG. 10, processes other than the process at steps S5000, S5010, S5020 and S5030 are the same as those executed by the computer program shown in FIG. 2. The program of FIG. 10 includes, in place of step S1050 of FIG. 2, the step S5010. The steps S5000, S5020 and S5030 are the same as steps S1040, S1060 and S1030 shown in FIG. 2, respectively. In the following, the difference will be described.

Referring to FIG. 1, the program includes: a step S5000, executed following step S1020, of receiving a job operation input by the logged-in user; a step S5010, executed following step S5000, of determining whether or not a prescribed time period has expired without any operation, and branching the flow of control depending on the result of determination; a step S5020, executed if it is determined at step S5010 that the prescribed time period has expired without any operation, of executing the tentative log-out process; and a step S5030, executed following step S5020, of camera-tracking the movement of logged-in user by controlling the camera device. If it is determined at step S5010 that the prescribed time period without any operation has not yet expired, the control returns to step S5000.

[Operation]

The image forming apparatus according to the present embodiment operates in the following manner. It is noted that operations other than the operation triggering the execution of tentative log-out process are the same as those of the first embodiment. Therefore, detailed description of similar operations will not be repeated.

If it is determined that a prescribed time period has expired without any operation by the logged-in user after log-in (YES at step S5010), the image forming apparatus executes the tentative log-out process (step S5020). In the tentative log-out process, as in the first embodiment, log-in screen image 250 shown in FIG. 5 is displayed on touch-panel display 172 (step S5020). After the display on touch-panel display 172 is switched to log-in screen image 250, the image forming apparatus tracks by the camera the movement of the head of logged-in user acquired as the feature data, by controlling camera device 152. Thereafter, the same operations as described in the first embodiment are executed.

Sixth Embodiment

Figure 11:
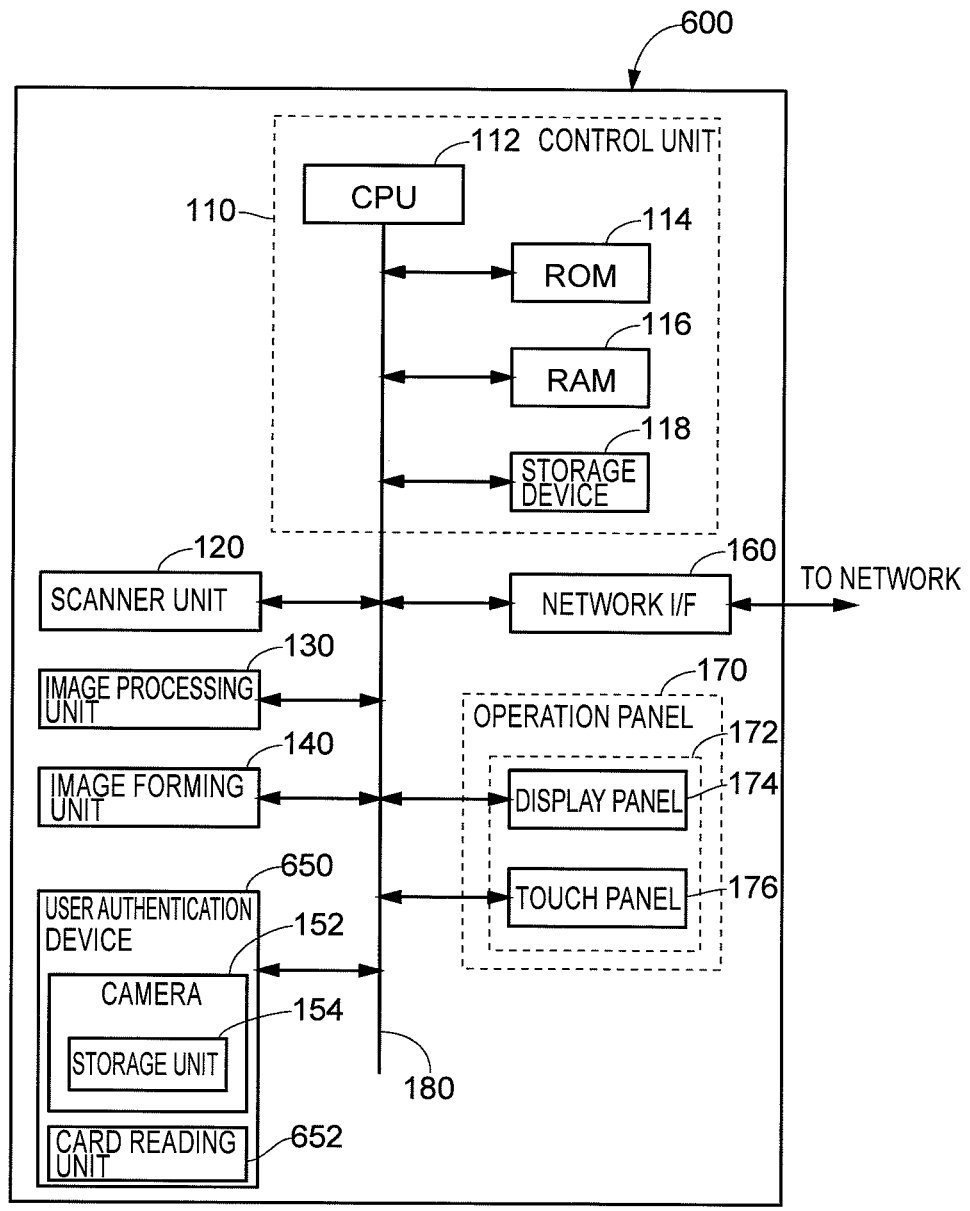
FIG. 11 is a control block diagram showing a hardware configuration of an image forming apparatus in accordance with a sixth embodiment of the present invention.

Referring to FIG. 11, an image forming apparatus 600 in accordance with the present embodiment authenticates a user by reading user information from an authentication card (not shown) storing user information. In this point, image forming apparatus 600 in accordance with the present embodiment differs from image forming apparatus 100 in accordance with the first embodiment that authenticates a user by the input of a user name and a password.

[Hardware Configuration]

Image forming apparatus 600 in accordance with the present embodiment includes a user authentication device 650 in place of user authentication device 150 (see FIG. 1). User authentication device 650 includes camera device 152 similar to that of the first embodiment. User authentication device 650 further includes a card reading unit 652 for reading user information stored in an authentication card. Card reading unit 652 is a non-contact type data reading device, and when an authentication card is held over card reading unit 652, it reads the user information stored in the authentication card. The authentication card is, by way of example, an IC card. The authentication card stores, as the user information, a user name and identification information (such as user ID) for uniquely identifying the user. When card reading unit reads the user information, user authentication device 650 executes the user authentication. User authentication device 650 maintains the logged-in state while the authentication card is held over card reading unit 652.

Further, in image forming apparatus 600 of the present embodiment, the program and the like stored in ROM 114 of control unit 110 or storage device 118 are different from those of the first embodiment. Other configurations are the same as those of image forming apparatus 100 in accordance with the first embodiment.

[Software Configuration]

In the image forming apparatus 600 in accordance with the present embodiment, the program shown in FIG. 12 is executed, in place of the program shown in FIG. 2. In the program shown in FIG. 12, processes other than the process at steps S6000, S6010, S6020, S6030, S6040 and S6050 are the same as those executed by the computer program shown in FIG. 2. The program of FIG. 12 includes, in place of steps S1000, S1010, S1050 and S1060, steps S6000, S6010, S6030 and S6040, respectively. Steps S6020 and S6050 are the same processes as steps S1040 and S1030 shown in FIG. 2, respectively. In the following, the difference will be described.

Referring to FIG. 12, the program includes; a step S6000 of determining whether or not a log-in operation has been done, and waiting until a log-in operation is done; and a step S6010, executed if the log-in operation is done at step S6000, of executing the normal log-in process. In the present embodiment, the log-in operation is done by holding an authentication card over card reading unit 652. Therefore, at step S6000, whether or not an authentication card is held over card reading unit 652 is determined. At step S6010, the user information of the authentication card is read and the log-in process is executed based on the read user information.

The program further includes: a step S6020, executed after step S1020, of receiving an input of job operation by the logged-in user; a step S6030, executed after step S6020, of determining whether or not the authentication card is being held over card reading unit 652, and branching the flow of control depending on the result of determination; a step S6040, executed if it is determined at step S6030 that the authentication card is not in the held state, of executing the tentative log-out process; and a step S6050, executed following step S6040, of camera-tracking the movement of logged-in user by controlling camera device 152. If it is determined that the authentication card is held at step S6030, the control returns to step S6020.

At step S6040, as the log-in screen image, a guide screen image guiding the method of log-in is displayed on touch-panel display 172. On the guide screen image, a message such as "For log-in, please hold your authentication card over the card reading unit" is displayed as the method of log-in.

[Operation]

The image forming apparatus according to the present embodiment operates in the following manner. It is noted that operations other than the operation triggering the execution of tentative log-out process are the same as those of the first embodiment. Therefore, detailed description of similar operations will not be repeated.

Image forming apparatus 600 maintains the logged-in state while the authentication card is held over card reading unit 652. If the authentication card is moved away from card reading unit 652, image forming apparatus 600 executes the log-out process. In the present embodiment, if it is detected that the authentication card is taken away from card reading unit 652 after log-in and it is detected that the authentication card is not held over the card reading unit 652, image forming apparatus 600 executes the tentative log-out process (step S6040). In the tentative log-out process, as in the first embodiment, the logged-in state is maintained (stored) internally. In the present embodiment, however, in the tentative log-out process, in place of the log-in screen image 250 shown in FIG. 5, a different log-in screen image (for example, the guide screen image) is displayed on touch-panel display 172.

(Modifications)

In the embodiments above, examples in which the present invention is applied to an MFP as an example of image forming apparatus have been described. The present invention, however, is not limited to such embodiments. The image forming apparatus may be any apparatus other than the MFP provided that it has the user authentication function. By way of example, the image forming apparatus may be a copy machine or a printer.

In the embodiments above, examples in which the present invention is applied to an image forming apparatus have been described. The present invention, however, is not limited to such embodiments. The present invention is applicable to any apparatus that requires user authentication, other than the image forming apparatus. By way of example, the present invention may be applied to an information display (IDP).

In the embodiments above, password authentication using input of a password and card authentication of reading information of an authentication card have been described as examples of user authentication. The present invention, however, is not limited to such embodiments. Other methods of user authentication may be used. By way of example, the user authentication may be done by biometric authentication such as face authentication. If the user authentication is done using face authentication, the camera-tracking of the logged-in user may be done utilizing the camera device for face authentication.

In the embodiments above, examples in which log-in screen image is displayed in the tentative log-out process have been described. The present invention, however, is not limited to such embodiments. The screen image displayed in the tentative log-out process may be any screen image other than the log-in screen image, provided that it prevents operation by another user by the name of the previous user. By way of example, an initial screen image (home screen image) when the operation is done without user authentication, may be displayed in place of the log-in screen image.

In the embodiments above, examples in which the head data is acquired as the feature data of the user have been described. The present invention, however, is not limited to such embodiments. Data of any portion other than the head may be used as the feature data, provided that it can be tracked by a camera. Further, the feature data representing the portion to be noted may be a color or a tone.

In the fifth and sixth embodiments above, examples in which camera-tracking starts after the tentative log-out process has been described. The present invention, however, is not limited to such embodiments. The camera-tracking may be started before the tentative log-out process.

In the sixth embodiment above, a configuration including a card reading unit consisting of a non-contact type data reading device has been described. The present invention, however, is not limited to such an embodiment. A contact type data reading device may be used for the card reading unit.

Embodiments obtained by appropriately combining the techniques described above are also encompassed by the technical scope of the present invention.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An apparatus for authorizing a user, the apparatus comprising:
   a display to display information;
   an image pick-up device to pick-up an image of the user;
   at least one processor; and
   a non-transitory computer-readable medium coupled to the at least one processor having instructions stored thereon that, when executed by the at least one processor, cause the at least one processor to perform operations comprising:

executing an authentication process for the user;

acquiring feature information of the user by using the image pick-up device;

tracking the user based on the acquired feature information by controlling the image pick-up device;

providing information to the display; and responsive to an interruption of tracking the user as the user moves outside of a tracking range of the apparatus, executing a process of canceling authentication for the user, wherein the apparatus is configured such that the display displays, responsive to the executing an authentication process for the user, an operation screen image to be operated by the user, wherein the apparatus is configured such that the display displays, responsive to (a) the apparatus tracking the user returning to a position permitting operation of the apparatus without interruption of tracking and (b) detecting said user front-facing to said apparatus, the operation screen image.

2. The apparatus of claim 1, wherein the apparatus is configured such that the display displays, responsive to the apparatus detecting the user having moved away from the apparatus, a screen image different from the operation screen image.

3. An apparatus for authorizing a user, the apparatus comprising:

a display to display information;

an image pick-up device to pick-up an image of the user;

at least one processor; and a non-transitory computer-readable medium coupled to the at least one processor having instructions stored thereon that, when executed by the at least one processor, cause the at least one processor to perform operations comprising:

executing an authentication process for the user;

acquiring feature information of the user by using the image pick-up device;

providing information to the display;

detecting that a predetermined amount of time has elapsed without any operation of an operation screen image by the user;

tracking, responsive to the detecting that a predetermined amount of time has elapsed without any operation of the operation screen image by the user, the user based on the acquired feature information by controlling the image pick-up device; and responsive to an interruption of tracking the user as the user moves outside of a tracking range of the apparatus, executing a process of canceling authentication for the user, wherein the apparatus is configured such that the display displays, responsive to the executing an authentication process for the user, the operation screen image to be operated by the user, wherein the apparatus is configured such that the display displays, responsive to (a) the apparatus tracking the user returning to a position permitting operation of the apparatus without interruption of tracking and (b) detecting said user front-facing to said apparatus, the operation screen image.

4. The apparatus of claim 3, wherein the apparatus is configured such that the display displays, responsive to the detecting that a predetermined amount of time has elapsed without any operation of the operation screen image by the user, a screen image different from the operation screen image, and wherein the image pick-up device is controlled to track the user responsive to the display displaying the screen image different from the operation screen image.

5. An apparatus for authorizing a user, the apparatus comprising:

a display to display information;

a reader to read user information from a storage medium storing the user information;

an image pick-up device to pick-up an image of the user;

at least one processor; and a non-transitory computer-readable medium coupled to the at least one processor having instructions stored thereon that, when executed by the at least one processor, cause the at least one processor to perform operations comprising:

executing an authentication process for the user based on the user information read by the reader;

acquiring feature information of the user by using the image pick-up device;

tracking, responsive to the user information of the storage medium becoming unreadable as the storage medium is moved away from the reader, the user based on the acquired feature information by controlling the image pick-up device; and responsive to an interruption of tracking of the user as the user moves outside of a tracking range of the apparatus, executing a process of canceling authentication for the user, wherein the apparatus is configured such that the display displays, responsive to the executing an authentication process for the user, an operation screen image to be operated by the user as long as the storage medium is provided at a position allowing reading of the user information of the storage medium, wherein the apparatus is configured such that the display displays, responsive to (a) the apparatus tracking the user returning to a position permitting operation of the apparatus without interruption of tracking and (b) detecting said user front-facing to said apparatus, the operation screen image.

6. The apparatus of claim 5, wherein the apparatus is configured such that the display displays, responsive to the user information of the storage medium becoming unreadable as the storage medium is moved away from the reader, a screen image different from the operation screen image, and wherein the operations performed by the at least one processor further comprise tracking, responsive to the display displaying the screen image different from the operation screen image, the user by controlling the image pick-up device.

7. An image forming apparatus comprising:

the apparatus of claim 1; and an image forming unit configured to form an image in accordance with an operation by the user authenticated by the apparatus.

8. An image forming apparatus comprising:

the apparatus of claim 3; and an image forming unit configured to form an image in accordance with an operation by the user authenticated by the apparatus.

9. An image forming apparatus comprising:
the apparatus of claim 5; and
an image forming unit configured to form an image in accordance with an operation by the user authenticated by the apparatus.

\* \* \* \* \*